United States Patent [19]

Csillag

[11] Patent Number: 4,797,326

[45] Date of Patent: Jan. 10, 1989

[54] SUPPORTED POLYCRYSTALLINE COMPACTS

[75] Inventor: Frank J. Csillag, The Woodlands, Tex.

[73] Assignee: The General Electric Company, Worthington, Ohio

[21] Appl. No.: 818,850

[22] Filed: Jan. 14, 1986

[51] Int. Cl.$^4$ ............................................. B22F 7/08
[52] U.S. Cl. ................................. 428/552; 428/551; 419/8
[58] Field of Search .............. 428/551, 552, 553, 561, 428/562, 564, 565; 51/204, 307, 309; 425/DIG. 26; 148/126.1, 130, 181, 437; 419/8

[56] References Cited

U.S. PATENT DOCUMENTS

| | | | |
|---|---|---|---|
| 3,136,615 | 6/1964 | Bovenkerk et al. | 51/307 |
| 3,141,746 | 7/1964 | De Lin | 51/307 |
| 3,233,988 | 2/1966 | Wentorf, Jr. et al. | 51/307 |
| 3,745,623 | 7/1973 | Wentorf, Jr. | 29/95 |
| 4,063,909 | 12/1977 | Mitchell | 51/309 |
| 4,108,614 | 8/1978 | Mitchell | 51/295 |
| 4,288,248 | 9/1981 | Bovenkerk et al. | 419/2 |
| 4,293,618 | 10/1981 | Hara et al. | 428/551 |
| 4,374,900 | 2/1983 | Hara et al. | 428/551 |
| 4,403,015 | 9/1983 | Nakai et al. | 428/565 |
| 4,505,746 | 3/1985 | Nakai et al. | 75/243 |
| 4,525,179 | 6/1985 | Gigl | 51/309 |

*Primary Examiner*—John F. Terapane
*Assistant Examiner*—Eric Jorgensen
*Attorney, Agent, or Firm*—Mueller and Smith

[57] ABSTRACT

Disclosed is a process for fabricating a composite polycrystalline diamond or cubic boron nitride (CBN) compact. Briefly, the process is conducted by mating a pre-formed sintered polycrystalline diamond or CBN compact and a plastically deformable support, and subjecting the mated composite compact to elevated temperature and pressure conditions sufficient to plastically deform the support into attachment with the compact. The temperature, pressure and time of application are inadequate to cause degradation of the diamond or CBN compact. The product configuration may be a conventional layered compact or may be a wire drawing die having a polycrystalline diamond or CBN core with a support jacket of a material such as a cemented metal carbide.

20 Claims, No Drawings

SUPPORTED POLYCRYSTALLINE COMPACTS

BACKGROUND OF THE INVENTION

The present invention relates to the preparation of supported polycrystalline diamond or cubic boron nitride (CBN) compacts and especially to the preparation of such compacts configured for use as wire dies.

A polycrystalline compact is a sintered polycrystalline mass of abrasive diamond and/or CBN particles bonded together to form an integral, tough, coherent, high strength mass. The preparation of diamond compacts is disclosed, for example, in U.S. Pat. No. 3,141,746. CBN compacts are described, for example, in U.S. Pat. Nos. 3,136,615 and 3,233,988. A supported polycrystalline compact is a compact attached to a reinforcing or substrate material such as cemented metal carbide. In one configuration referred to as supported wire die compact, a core of polycrystalline diamond or CBN is jacketed by an annular support of, for example, cemented carbide or stainless steel.

Supported compacts often are formed in a single step in situ process such as described in U.S. Pat. Nos. 3,745,623, 3,831,428, 3,767,371, and 3,743,489. In such a process, a metal (such as cobalt) which serves as the cementing agent of the cemented carbide support flows under high temperature and pressure into the polycrystalline mass to act therein as a catalyst for the formation of crystal-to-crystal bonds. One problem which may occur in such a single step process, and especially in the production of a wire drawing die compact with an annular support, involves cementing agent/catalyst depletion at the polycrystalline diamond or CBN/support interface. Thus, in the case of a cobalt-cemented tungsten carbide supported wire die compact, if there is an excessive flow of cobalt from the carbide support ring, a depleted zone or ring may develop in the carbide accompanied by micro-cracks extending into the support material. In addition, a single step process affords no opportunity to separately inspect the unsupported polycrystalline mass. As a result, if any defect should occur in either the compact or in the support material, the entire assembly must be rejected rather than just the defective component. Similarly, system parameters in an in situ process need to be adjusted to optimize the formation of the composite whole, and cannot be adjusted to optimize the formation of the individual components. Finally, such single step processes require that both the beginning crystalline material and the support material be subjected to highly elevated temperature and pressure conditions sufficent to form the polycrystalline mass. As a result, there is a significant decrease in press throughput as compared to operations pressing just the crystalline material.

Although less frequently employed, two step processes wherein a compact is first formed and is then attached to a support also are known. Thus, the use of a brazing material for attachment purposes is described in the above noted U.S. Pat. No. 3,141,746. Similarly, supported wire die compacts made with a pre-formed cylindrical polycrystalline core around which an annular jacket of metal support material (e.g. stainless steel) is shrink-fitted in place have been used successfully. However, existing two step processes for the formation of supported polycrystalline compacts pose certain difficulties. In the brazed approach one problem is to adequately wet the crystalline surfaces to which the support is atached. The situation is aggravated further in a more recent form of polycrystalline diamond compact termed the thermally stable compact as disclosed in U.S. Pat. Nos. 4,224,380 and 4,288,248, since a thermally stable compact can comprise a porous, nearly pure diamond material. Even in the successful shrink-fitting two-step wire die process mentioned above, it would be beneficial to improve the strength of the attachment between the compact and the surrounding metal support. In addition, shrink-fitting by its nature requires the maintenance of close tolerances between the parts to be joined. Naturally, this restriction adds to the difficulty and cost of manufacture.

BROAD STATEMENT OF THE INVENTION

One object of the present invention, then, is to form supported polycrystalline compacts including supported thermally stable polycrystalline diamond compacts. Such object is accomplished by separately forming both a polycrystalline compact having a surface, and a metal carbide or other plastically deformable support having a support surface. The compact and support are then mated at their respective surfaces and subjected to pressure and temperature conditions sufficient to plastically deform the support into attachment (chemical, physical or a combination) with the compact. While conditions may be varied and optimized depending on the materials used, attachment conditions will be sufficient if the temperature employed is adequate to place the support material in a plastic state; the pressure is adequate to deform the plasticized material into intimate contact with the compact surface; and the combinatin of temperature, pressure and time is inadequate to cause substantial or significant degradation of the polycrystalline diamond or cubic boron nitride (CBN) compact. As can be appreciated, the required conditions beneficially can be less than those required for an in situ process. Sustantial or significant degradation comprehends the diminution of performance properties of the compact making it unsuitable for its intended use.

The attachment of the support to the polycrystalline mass apparently involves a physical component resulting from the mis-match in thermal expansion (contraction) characteristics between the respective materials, and particularly because of the relatively low expansion coefficient of the poycrystalline materials involved. When the resulting product is recovered by return to ambient conditions, the support material normally will exert a radial compression on the polycrystalline compact supported thereby. In a wire die configuration, the support annulus beneficially exerts both a radial and an axial compression against the central polycrystalline core. The attachment between the support and the polycrystalline mass also may involve a chemical component if the materials at their mating surfaces are interactive.

In another aspect of the present invention, an interface material may be placed between the compact and support prior to processing in order to control the nature and degree of the attachment between the compact and the support. In addition, the use of such an interface material can help minimize the machining of the support and of the compact which may be required before attachment in order to ensure a proper fit. Another advantage is the ability to place the polycrystalline diamond or CBN compact under variable and controllable compressive loading by a carbide support, e.g., in order to match or maximize carbide grade characteristics. Another advantage is the ability to support thermally stable compacts. With respect to thermally-stable polycrystalline diamond compacts, the use of interface materials, such as those exhibiting a reduced melting point and which are more reactive with carbon, can improve the bonding between the compact and the support material. Suitable interface materials include cobalt or other catalysts or solvents in combination with boron or a mixture thereof with other carbide formers which further increases the reactivity of interface materials under conditions of the process. Such reactive interface materials are thought to be useful in view of the difficulty noted above which works against the bonding of carbide support material to thermally stable compacts.

Further advantages over single step in situ processes include the ability to increase high temperature/high pressure apparatus throughput since only the preformed polycrystalline compact need be exposed to diamond-forming conditions. Also, non-conforming compacts may be rejected separately in the pre-form state rather than in the final supported state. Additionally, more freedom is available in the selection of carbide grades than in the in situ process owing to the absence of the cobalt-depletion phenomena noted above. These other advantages will be readily apparent based on the disclosure contained herein.

DETAILED DESCRIPTION OF THE INVENTION

The supported polycrystalline diamond or CBN compacts of the present invention are unique in several respects. Thus, the products possess physical properties which replicate the physical properties of conventionally sintered supported compacts wherein the support is provided in situ. For example, compacts of the present invention have a level of uniform compressive loading not found in brazed or shrink-fitted supported compacts. Concomitantly, incidences of cobalt or other catalyst or solvent depletion from carbide substrates which are possible in situ prepared supported compacts are substantially eliminated and characteristics of the tungsten carbide (WC) or other carbide substrate thereby are more uniformly maintained. Moreover, the process of the present invention can be applied to thermally stable polycrystalline compacts which further enhances the utility of the present invention.

Under the temperature and pressure of operation of the present invention, WC or other carbide substrate material becomes plastic or plastically deformable so that the respective mating surfaces of the support and polycrystalline compact are placed in intimate contact. Plastic for present purposes comprehends moldable, pliable, and/or resilient. Plastically deformable, then, comprehends a deforming or molding operation wherein the material returns substantially to its original configuration, i.e. the material has a degree of memory. Because the substrate is plastic under the conditions of operation, virtually no harm is done to the substrate or to the poycrystalline compact. Of course, this assumes that conditions of operation will be substantially preclusive to graphitization of the diamond or reconversion of cubic boron nitride to its hexagonal or other form. Once the required time at temperature and pressure has been reached, heating of the reaction cell within which the supported compact is disposed is ceased and pressure is released. Upon cooling, the polycrystalline material contracts much less than the carbide support. Such thermal expansion differential between the core and the support causes the polycrystalline core to be loaded compressively and remain firmly attached to the carbide support. In a conventional compact configuration (e.g. such as in U.S. Pat. No. 3,745,623), a carbide support in the present invention exerts a compressive radial force against the diamond or CBN core to which it is attached. In a wire drawing die configuration, the polycrystalline core is loaded compressively both radially and axially. Additionally, diamond-to-carbide bonding is thought to contribute to this attachment.

Broadly, conditions of the present invention are such that the support is plastically deformed. In terms of temperature, the support must be rendered plastic. In terms of pressure, the plastic support must be moved or deformed. Such conditions of operation advantageously include a temperature, a pressure, and a time such that the polycrystalline or CBN compact is not subjected to conditions whereat significant reconversion of the superabrasive particles occurs (e.g. graphitization of diamond), or is otherwise damaged. Accordingly, the process preferably will be conducted at a temperature and at a pressure which may be within the diamond stable or CBN stable region. For diamond, the temperature ranges from between about 1000° to about 2000° C. at a pressure which may be in excess of 40 Kbars (e.g. 40–80 Kbars). For CBN, similar temperatures and pressures apply. Within such stable regions, conditions of temperature and pressure typically will be on the lower ends of the ranges as the polycrystalline compacts already are sintered. In fact, it may be possible to operate the processes under conditions outside of the diamond or CBN stable region provided that such conditions are maintained for a length of time insufficient to cause noticeable damage to the polycrystalline cores. In this regard, the process is practiced for time periods which are typically much less than time periods encountered industrially in the manufacture of polycrystalline compacts. Accordingly, for polycrystalline diamond compacts, a pressure of about 40–50 Kbars may be used but may not be necessary, and a temperature of about 1000°–1300° C. may be maintained for time periods typically not exceeding a few minutes. Shorter time periods also may be used. The same conditions apply generally for CBN compacts also. Since less demanding processing parameters are required, use of lower temperature and pressure presses than in the production of polycrystalline compacts is enabled. Alternatively, it may be possible to extend the serviceable life of the existing high pressure apparatus by operating under less demanding conditions than required for in situ processes.

Polycrystalline diamond compacts which may be supported in accordance with the present invention are well-known in the art and methods for making such polycrystalline diamond compacts are detailed, for example, in U.S. Pat. No. 3,141,746. Briefly, diamond crystals or particles are placed adjacent a source of catalyst or solvent and then subjected to high pressure and high temperature conditions for a time sufficient to bond or sinter the diamond crystals together. While the relative shape of the abrasive mass and catalyst can be varied, typically the abrasive mass will be cylindrical and the catalyst will be a disk placed on top of or below the diamond mass or an annulus which surrounds the cylinder of abrasive crystals. The catalyst or solvent generally is cobalt, nickel, or iron with cobalt being preferred. Alternatively, the catalyst can be selected from any known catalyst which also includes ruthenium, rhodium, palladium, platinum, chromium, manganese, tantalum, osmium, iridium, or mixtures or alloys thereof. The catalyst may be admixed with the abrasive crystals in addition to or instead of being a separate mass placed adjacent to the abrasive crystals.

Cubic boron nitride compacts are manufactured in a manner quite similar to that described for polycrystalline diamond compacts. In the case of CBN compacts, however, the metal swept into the CBN crystal mass may or may not be a catalyst or solvent for CBN recrystallization. The HP/HT sintering process for CBN is carried out in the CBN stable region which is in the range of pressure and temperature conditions under which the CBN is thermodynamically stable. Methods for making CBN compacts can be found in U.S. Pat. Nos. 3,233,988, 3,743,489, and 3,767,371.

As noted above, the manufacture of thermally stable compacts is described in U.S. Pat. Nos. 4,288,248 and 4,224,380. Substantially all of the metallic (catalyst) phase from polycrystalline diamond or CBN compacts has been removed to yield a compact comprising self-bonded diamond or CBN particles with an interconnected network of pores dispersed throughout. Thermally stable compacts can withstand exposure to temperatures of about 1200°–1300° C. in a non-oxidizing atmosphere without substantial thermal degradation, giving them an advantage over conventional compacts which are marked by the onset of thermal degradation at a temperature of between about 700° and about 900° C. at atmospheric pressure.

The support or substrate to which the polycrystalline compacts are bonded or joined generally is a metal carbide substrate with metals generally selected from the group consisting of tungsten, titanium, tantalum, molybdenum, and mixtures thereof; however, other materials (e.g. ceramics or metals) may be used as support materials. Preferably, the carbide molding powder will be a cemented metal carbide powder with the cementing metal being selected from cobalt, nickel, iron and mixtures thereof, is as is well known in this art. Cobalt cemented tungsten carbide is the material of choice for making the support material to which the polycrystalline compact is attached. In this regard, conventional supported polycrystalline compacts often rely on the carbide support for providing a source of catalyst/solvent which sweeps through the abrasive crystals for forming the polycrystalline diamond or CBN compact which is in situ bonded to the substrate for support. The use of the catalyst/solvent from the support material is well known in both the typical cylindrical and wire die configurations. The present invention permits the use of metal carbide supports low in cobalt content, which carbide grades are harder and stiffer (higher elastic modulus), hence closer to the diamond in stiffness which means better support for the diamond core. Such low cobalt carbide grades, however, are less tough than metal carbide supports containing a higher concentration of cobalt (cobalt being referred to by illustration rather than limitation). The altering of the metal carbide support composition is permitted more readily by the present invention because the support can be attached to an already sintered polycrystalline compact under conditions wherein no catalyst/solvent need be present.

Theoretically, the pre-sintered polycrystalline diamond or CBN compacts may be in any desired configuration or geometry as can the substrate which may be pre-sintered also or may be only pressed into a shape desired for matching the configuration of polycrystalline compact. The wire die configuration having a polycrystalline compact core and annular support is most preferred for the application of the invention. Both the support and the polycrystalline compact should have surfaces which are adapted to be mated. Mating of such surfaces merely connotes placing the support and compact adjacent each other. The mated compact and support then may be placed within the reaction cell of an HP/HT apparatus, such as those found in the patents cited above with respect to the manufacture of polycrystalline diamond and CBN compacts.

On occasion, a polycrystalline core for use in a wire die configuration may be pressed into a sleeve (loose or tight fitting) prior to insertion into a carbide annulus. By using sleeves, irregularities can be matched better, i.e. by using a less expensive, easier to machine material for the sleeve. Sleeves may be made from material including stainless steel, tungsten, cobalt or other desired material. It should be understood that press-fitting the compact core into such a sleeve does not result in the sleeve exerting any significant axial compression and only some non-uniform radial compression on the press-fitted core. The polycrystalline core, with or without a sleeve, may fit into a carbide annulus somewhat loosely, leaving a slight air gap therebetween. Such air gap may be filled with additional metal carbide or other powder, if desired. The same is true with respect to a cylindrical or other shaped compact which is disposed upon a corresponding support. In this regard, it should be understood that various interface materials may be placed between the mating surfaces of the compact and the support. Such interface binders can be used to affect (e.g. control) the degree of radial or axial compression. Suitable interface materials include, for example, cobalt, nickel, tungsten, zirconium, tantalum, molybdenum, manganese, or alloys such as, for example, cobalt/boron, nickel/manganese, iron/nickel, cobalt/molybdenum/boron, nickel/manganese, iron/nickel, cobalt/molybdenum/boron or the like or mixtures thereof. Such interfacial materials may be provided in powder form or may be pre-formed into an annular sleeve for disposing around a diamond or CBN core intended for a wire die.

It is known that thermally stable compacts are recalcitrant to being bonded or attached to supports due to gaseous/liquid/solid films which inhibit wetting of the compact by the bonding agent being used to bond the compacts to the substrates. Further, blocking of pores in the thermally stable compact by impurities prevents penetration of the bonding agent into the core and reduces the strength of the bond. Thus, it may be advantageous to utilize a reactive bonding mixture in order to enhance the attachment or bonding of thermally stable compacts onto metal carbide supports. The physical and/or chemical properties of the bonding agent, such as cobalt, can be altered favorably by the addition of elements such as boron or titanium. The addition of boron to cobalt reduces the melting point and yields a more reactive mixture with carbon. The boron in the mixture helps in wetting the diamond and forms cobalt-boron compounds, e.g. such as $Co_{11}B_2C$. Addition to the cobalt/boron mixture or other carbide formers increases the reactivity further. Other carbide formers which may be used include, for example, titanium, tantalum, tungsten, niobium, molybdenum, and the like and mixtures thereof. In this regard, it should be appreciated that other catalyst/solvent metals other than cobalt may be used. Accordingly, suitable reactive bonding alloys include, for example, nickel/boron, cobalt/tantalum/-boron, iron/nickel/boron, cobalt/boron, cobalt-/boron/copper, cobalt/boron/tungsten, cobalt-/boron/molybdenum, cobalt/niobium/boron, and the like and mixtures thereof. It is thought, though unproven, that use of such reactive bonding alloys, however, may eliminate compressive loading of the polycrystalline compact by the substrate to which it is attached or bonded. For some uses, however, such non-compressively loaded, supported polycrystalline cores may be quite advantageous, e.g. for subsequent bonding.

The following examples show how the present invention can be practiced, but should not be construed as limiting. In this application, all percentages and proportions are by weight unless otherwise expressly indicated. Also, all citations referred to herein are expressly incorporated herein by reference.

EXAMPLES

Example 1

A pre-sintered diamond cylindrical core with an outside diameter (OD) nominal dimension of 0.5 inches and a height of 0.5 inches was placed into a 16 vol-% cobalt cemented tungsten carbide ring with dimensions of inside diameter (ID) 0.5 inches, OD of 1.0 inches, and a height of 0.5 inches. The ring bearing the sintered core was enclosed in a covered zirconium container and placed within a conventional HP/HT apparatus. Hot pressing of the sealed container was conducted at 1200° C. at a pressure of 50 Kbar for 15 minutes. Such conditions are within the stable range of diamond with respect to pressure and temperature. First the temperature and then the pressure were removed from the cell and its contents removed upon cooling. Such product had the visual appearance of a conventionally prepared in situ bonded polycrystalline diamond wire drawing die.

Example 2

The amount of core compression can be estimated by notching the bonded support ring from the outer diameter toward the core using a wire EDM (electrical discharge machining) apparatus. The notch is made perpendicular to the diamond core's tangent representing the shortest distance between the carbide ring outside diameter and the diamond core. The depth of the notch, measured from the outside diameter inward to the point at which catastrophic failure occurs, is a measure of the amount of radial core compression which the ring exerts against the polycystalline diamond core.

In this example, a polycrystalline diamond wire drawing die was made in substantially an identical manner as that described in Example 1. The resulting die had an overall OD of 0.950 inches, a carbide ring ID of 0.51 inches, and a thickness of 0.45 inches. The carbide ring was made from 16 vol-% cobalt tungsten carbide. The EDM apparatus was equipped with a 0.010 inch diameter wire and was used to notch the carbide as described above. A notch depth of 0.075 inches was required before catastrophic failure occurred. Subsequent model calculations yielded a radial core compression of 54 kpsi. These results demonstrate the compression which is exerted by the carbide annulus on the polycrystalline diamond core of a diamond wire drawing die made in accordance with the present invention.

Example 3

Exerting a known pressure on the diamond core of a wire drawing die made in accordance with the present invention is a measure of the strength of the attachment between the diamond core and the supporting carbide ring. In this type of test a rod with a diameter slightly smaller than the core diameter is used to apply pressure to the core. A die blank made in accordance with the procedure of Example 1 was made to have an OD of 0.950 inches, a carbide annulus ID of 0.51 inches, and a thickness of 0.45 inches. This die blank was placed in an Instron test machine such that a rod was pushing only on the core. With a load of 17,560 pounds (instrument maximum) on the rod, no push-out of the core was noted indicating that the attachment of the polycrystalline diamond core to the carbide ring indeed was effective.

Example 4

A pre-sintered thermally stable diamond cylindrical compact with an OD of 0.53 inches and a thickness of 0.05 inches was placed onto a cobalt cemented tungsten carbide substrate (13 wt-% cobalt) having dimensions of OD 0.56 inches and a thickness of 0.15 inches. Various bonding agents were placed between the diamond compact and the cemented tungsten carbide support. The bonding agents tested were: (1) cobalt containing 5.19 weight percent boron; (2) cobalt containing 22.3 weight percent tantalum and 4.18 weight percent boron; and (3) cobalt containing 58.5 weight percent copper and 31.5 weight percent manganese. Bonding agent (2) was tested at various thicknesses. The compact, bonding agent, and tungsten carbide support were enclosed in a zirconium container and placed in a conventional HP/HT apparatus. Attachment was accomplished at a temperature of between about 1100° and 1200° C. under a pressure of 50 Kbar for 10 minutes. It should be noted that the top and bottom surfaces of the thermally stable diamond compacts were lapped smooth and flat, the pieces cleaned, rinsed, dried, and fired in a hydrogen atmosphere at 1,050° C. for one hour prior to attachment.

The supported thermally stable compacts removed from the HP/HT apparatus were ground to a diameter of 0.4995±0.0003 inches and the interface between the compact and tungsten carbide clearly exposed. The tungsten carbide substrate was placed inside a supported circular holder made of tungsten carbide and having an ID of 0.5000±0.0001 inches with only the attachment line and diamond table being exposed. A second, unsupported holder was placed around the diamond table and attachment line. The unsupported extension was then forced to shear. The amount of force required to initiate shear is a measure of attachment strength. The data in the following table summarizes the strengths measured between the thermally stable polycrystalline diamond compacts and the tungsten carbide supports.

| Bonding Agent No. | Type | Bonding Agent Thickness (mils) | Shear Strength (kn/cm$^2$) |
| --- | --- | --- | --- |
| 1 | CO/B | 1.8 | 9.1 |
| 2 | CO/Ta/B | 2.4 | 22.7 |
| 2 | CO/Ta/B | 4.8 | 19.6 |

-continued

| Bonding Agent No. | Type | Bonding Agent Thickness (mils) | Shear Strength (kn/cm$^2$) |
|---|---|---|---|
| 2 | CO/Ta/B | 2.4 | 6.6 |
| 3 | CO/Cu/Mn | 2.0 | 18.9 |

The above-tabulated data shows that the thermally stable polycrystalline diamond compacts were effectively attached to the tungsten carbide substrates. The effect of shear strength on cutting performance has not yet been evaluated; however, it is believed that higher shear strengths, above some minimum value, are desirable. While not yet tested, it is believed that the presence of bonding agents is not necessary for fabricating the supported thermally stable compacts of this example. Further, it is believed that the inventive process has application to conventional diamond compacts also.

What is claimed is:

1. A process for fabricating a supported polycrystalline diamond or CBN compact which comprises:
   (a) forming a sintered polycrystalline diamond or CBN compact having a surface;
   (b) separately forming a plastically deformable support having a support surface;
   (c) mating said diamond or CBN compact and said support at their respective surfaces;
   (d) subjecting said mated diamond or CBN compact and said support to elevated temperature and pressure conditions sufficient to plastically deform said support surface into attachment with said compact surface, said temperature, pressure and the time of application thereof being inadequate to cause substantial degradation of said diamond or CBN compact; and
   (e) recovering the resulting supported compact.

2. The process of claim 1 wherein said plastically deformable support is a cemented metal carbide.

3. The process of claim 2 wherein said plastically deformable support is selected from the group consisting of titanium carbide, tungsten carbide, tantalum carbide, molybdenum carbide, and mixtures thereof.

4. The process of claim 3 wherein said metal carbide is a cobalt cemented metal carbide.

5. The process of claim 1 wherein said elevated temperature ranges from between about 1000° and about 2000° C., and said pressure is greater than at least about 5 Kbar.

6. The process of claim 5 wherein said elevated temperature is between about 1000° and about 1300° C. and said pressure is between about 5 and about 50 Kbar.

7. The process of claim 1 wherein said compact of (a) is a thermally stable compact characterized as a compact comprising self-bonded diamond or CBN particles with an interconnected network of pores dispersed throughout.

8. The process of claim 7 wherein an interface binder is disposed between said thermally stable compact and said metal carbide support, said interface binder selected from the group consisting of cobalt, nickel, tungsten, zirconium, tantalum, molybdenum, manganese, iron, titanium, cobalt/boron, nickel/manganese, iron/nickel, cobalt/molybdenum/boron, cobalt/tantalum/boron, iron/nickel/boron, cobalt/boron/copper, cobalt/boron/tungsten, cobalt/niobium/boron, and mixtures thereof.

9. The process of claim 1 wherein an interface binder is disposed between said respective surfaces.

10. The process of claim 9 wherein said interface binder is selected from the group consisting of cobalt, nickel, tungsten, zirconium, tantalum, molybdenum, manganese, iron, titanium, cobalt/boron, nickel/manganese, iron/nickel, cobalt/molybdenum/boron, cobalt/tantalum/boron, iron/nickel/boron, cobalt/boron/copper, cobalt/boron/tungsten, cobalt/niobium/boron, and mixtures thereof.

11. The process of claim 1 wherein said plastically deformable support is a metal carbide annulus which is mated around said polycrystalline compact.

12. The process of claim 1 wherein said polycrystalline compact comprises a polycrystalline diamond compact.

13. The process of claim 1 wherein said polycrystalline compact comprises a polycrystalline cubic boron nitride compact.

14. A composite polycrystalline diamond or CBN compact which comprises a pre-sintered compact which has been attached to a metal carbide support at elevated temperature and superatmospheric pressure.

15. The composite compact of claim 14 wherein an interface binder is disposed between said pre-sintered compact and said metal carbide support.

16. The composite compact of claim 15 wherein said interface binder is selected from the group consisting of cobalt, nickel, tungsten, zirconium, tantalum, molybdenum, manganese, iron, titanium, nickel/boron, cobalt/tantalum/boron, iron/nickel/boron, cobalt/boron, cobalt/boron/copper, cobalt/boron/tungsten, cobalt/boron/molybdenum, cobalt/niobium/boron, cobalt/copper/manganese, and mixtures thereof.

17. The composite compact of claim 14 which is a composite polycrystalline diamond compact.

18. The composite compact of claim 14 which is a composite polycrystalline cubic boron nitride compact.

19. The composite compact of claim 14 wherein said bonding is conducted at a temperature of between about 1000° and 2000° C. at a pressure in excess of 5 Kbars for a time adequate to bond said compact to said support, said temperature, pressure and the time of application thereof being inadequate to cause substantial degradation of said diamond or CBN compact.

20. The composite compact of claim 14 wherein said pre-sintered compact is a thermally stable compact comprising self-bonded diamond or CBN particles with an interconnected network of pores dispersed throughout.

* * * * *